United States Patent [19]

Luboshez

[11] 4,130,351
[45] Dec. 19, 1978

[54] RADIO-CHROMIC COMBINED ABSORBING REFLECTING AND TRANSMITTING PANEL

[76] Inventor: Sergius N. F. Luboshez, 3530 Pinetree Terrace, Falls Church, Va. 22041

[21] Appl. No.: 821,703

[22] Filed: Aug. 4, 1977

[51] Int. Cl.² ............................................. G02B 27/00
[52] U.S. Cl. .................................... 350/263; 350/354; 350/264; 350/284
[58] Field of Search .................... 350/160 P, 263, 264, 350/284

[56] References Cited

U.S. PATENT DOCUMENTS

| 2,874,611 | 2/1959 | Luboshez | 350/263 |
| 2,874,612 | 2/1959 | Luboshez | 350/263 |
| 3,257,486 | 6/1966 | Luboshez | 350/263 X |
| 3,443,860 | 5/1969 | Luboshez | 350/263 |
| 3,684,352 | 8/1972 | Luboshez | 350/263 X |
| 4,035,539 | 7/1977 | Luboshez | 350/264 X |

*Primary Examiner*—Richard A. Wintercorn
*Attorney, Agent, or Firm*—John Harrow Leonard

[57] ABSTRACT

A radiant energy shade having a front panel of transparent sheet material pleated in parallel pleats, and a planar rear panel of radio-chromic sheet material which is normally transparent, but which darkens on exposure to the rays from the source of radiation. The shade is installed with the pleats partially open and, defining with the rear panel, triangular cross sections, preferably with the base side of each pleat extending at 90° to the plane of the rear panel and with the other side oblique to the plane of the rear panel. The oblique sides are coated with opaque reflective material for their full length from the forwardmost edge part way toward the plane of the rear panel to provide show areas. The parallel base sides of the pleats and the remaining portions of the oblique sides are left clear. At higher levels of the source or sun, all of the direct rays are reflected forwardly by the coated show areas, while the shaded areas of the front panel and of the rear panel remain clear. At lower levels of the sun some rays do not strike the show areas, but strike and pass through the clear or shade areas of the front panel, striking areas of the rear panel which thereupon darken, thus excluding direct rays at lower sun levels.

9 Claims, 3 Drawing Figures

RADIO-CHROMIC COMBINED ABSORBING REFLECTING AND TRANSMITTING PANEL

BACKGROUND OF INVENTION (1) Field of Invention

Shading and heat insulating structures.

(2) Description of Prior Art

Shades which, by reflecting and cutting off, and in some instances absorbing, the direct rays radiating from the sun while transmitting the indirect rays reflected from objects in the sunlight, discriminate between direct radiation and diffused indirect radiation emanating from the source, are known in the art. Such are disclosed in U.S. Pat. No. 3,443,860, issued May 13, 1969, entitled "Pleated Sheet for Controlling Heat and Light", and U.S. Pat. No. 3,684,352, issued Aug. 15, 1972, and entitled "Radio-Chromic Combined Absorbing, Reflecting and Transmitting Structure."

As disclosed in the earlier of the above patents, the shade comprises a sheet of transparent light transmitting material having a light reflecting coating on the portions of one side of each pleat providing show areas. These areas are so arranged that when the pleats are in open formation, the show areas intercept direct sun rays and prevent them from reaching so-called shade areas of the pleats. Usually the shade area of each pleat is the other side of the pleat, plus an adjacent portion of each pleat between said other side and the coated show area thereof. With this structure, the rays of the high sun are intercepted by the show areas and reflected back toward the source. The shade areas are shaded by these show areas but permit the passage of indirect light therethrough into the room and also afford a view of the outside by a person in a room. However, at low levels of the sun, it often happens that the direct rays, approaching horizontal, pass through the clear shade portions of the sides of the pleats adjacent the show areas.

At first this disadvantage was overcome by coating the entire face of one side of each pleat with the opaque reflecting material, but this resulted in a sacrifice of indirect light and a decrease in the vision of the outside. Next, as described in the above U.S. Pat. No. 3,684,352, this disadvantage was sought to be overcome by making the shade of a sheet of radio-chromic material, pleated in like fashion, but without any coating. With the latter shade the show areas expand and contract, depending upon which areas are struck by the direct sun rays. Those struck darken and provide the show areas which shade other areas, leaving the other or shade areas clear for viewing the outside and for permitting the passage of indirect and less intense light therethrough. However, it often happens that the radio-chromic material is not as highly reflective as desired when dark and is very expensive.

SUMMARY

In accordance with the present invention, the advantages of the shades of the above patents are combined, with the elimination of the disadvantages of both and provisions of additional advantages. This is accomplished by using the above pleated shade of my earlier patent, with its opaque show areas and clear shade areas as a front panel, and applying to the rear of it an unpleated planar radio-chromic sheet as a rear panel. As a result of the combination, the direct and intense rays of the sun at relatively high sun are reflected and the less intense rays of the lower sun, as during late afternoon, are prevented only by the radio-chromic material exposed thereto, thus leaving as large a proportion of clear shade area for viewing the outside as is consistent with the elevation of the sun at a particular time.

A further advantage is that the shade provides a double row of isolated air spaces of triangular cross sections which act as heat insulators and reduce the passage of heat through the shade.

Various other objects and advantages will become apparent from the following description in which reference is made to the drawing.

BRIEF DESRIPTION OF THE DRAWING

Figure 2:
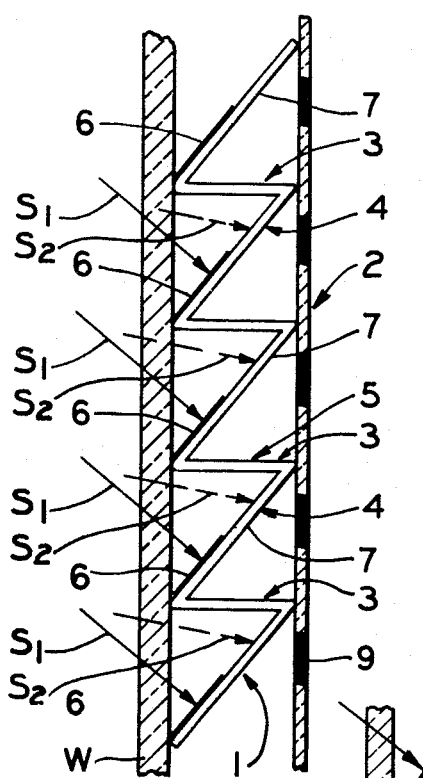
FIG. 2 is a cross sectional view of the shade illustrated in FIG. 1, and is taken on the line 2-2 thereof, and shows the shade with the pleats of the front panel open to the usual extent.
Figure 1:
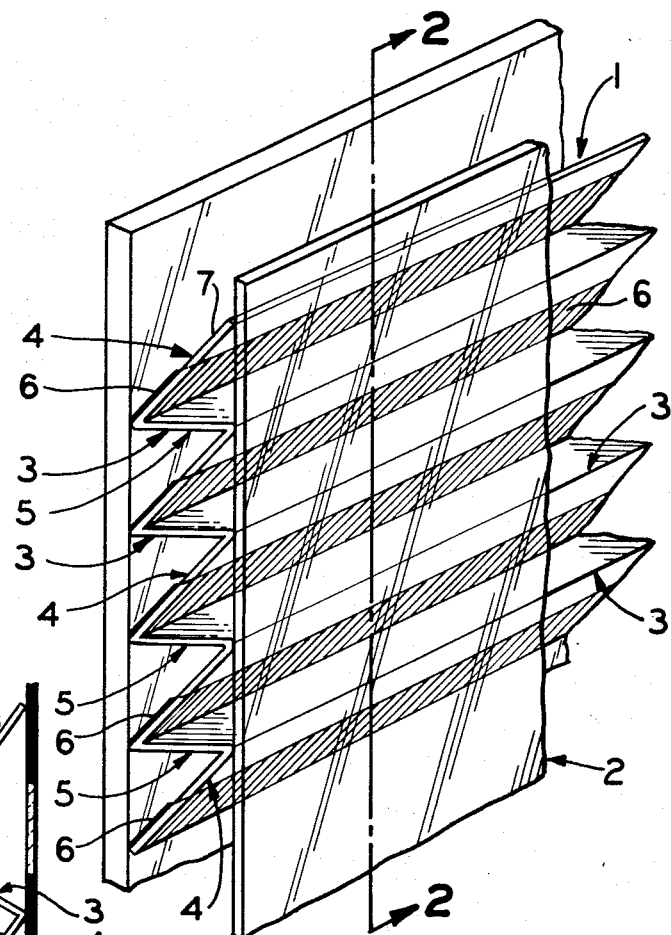
FIG. 1 is a fragmentary perspective view illustrating the shade of the present invention, and indicating certain operating relations of the show and shade areas thereof with the sun at different elevations.

Referring to FIGS. 1 and 2, the structure is shown installed against a window pane W, and comprises a pleated front panel 1 and a planar rear panel 2. The front panel 1 comprises a sheet of transparent material which may be glass or resilient plastic material such as cellulose acetate, cellulose acetate butytate, polyesters, polycarbonates, or other well known plastics, such as MYLAR and the like. A plastic which has high self-restoring properties, can be pleated readily, and yet will retain its pleated configuration is preferred. One sheet material that is particularly adapted for this purpose, especially if the shade is to be resilient, is marketed under the name of MYLAR. It has the additional advantage that it retains its transparency after prolonged exposure to the sun. Though resilient, it retains its pleated condition while remaining resilient, thus permitting the pleats to be opened to different degrees when tensioned edgewise of the sheet in a direction transversely of the pleats. When released, the pleats are self-restoring to their flat, unopened condition.

The rear panel 2 is a flat sheet of photo-chromic or radio-chromic material. It may be of the above plastics or of glass. Glass is very desirable as the radio-chromic effect is more enduring in glass than in sheet plastic.

The front panel 1 is in the form of a plurality of pleats 3, each pleat having sides 4 and 5, respectively. The panel is generally arranged with the pleats extending endwise horizontally. The pleats are preferably of uniform side and shape and parallel to each other. The material is flat pleated, as described in the earlier of the above patents.

In manufacturing the shade, the pleats of the front panel 1 are then opened so that one side 4 of each pleat extends oblique to the rear panel 2 and the side 5 extends approximately 90° to the rear panel. As a result, the cross section of each pleat defines with the rear panel 2 a triangle of which the side 5 of the pleat is the base of the triangle.

The forward face of each of the sides 4 has a portion 6 which, from its forwardmost edge part way toward its rear edge, is coated with opaque, or translucent, light reflective material and heat reflective material, such as metallized paint, to provide shoe areas. This coating is generally of uniform width and preferably extends from the forwardmost edge of the side 4 of each pleat about half the distance toward the rear edge thereof.

Assuming the front panel 1 is disposed with its pleats open so that the sides 5 of the pleats are at right angles to the plane of the rear panel 2, it will be seen that the coated portions 6 provide show areas which, in all except very low elevations of the sun, are struck by the direct sun rays $S_1$, as shown in FIG. 2, and are reflected back toward the source or outwardly. These show areas 6 shade the sides 5 and also the rear uncoated portions of the next adjacent sides 4, as indicated at 7.

Generally this structure reflects the direct rays of the sun during the larger portion of the time of exposure, and especially during the summer months, while permitting the indirect light to pass through the sides 5 and the uncoated shade areas 7, so as to afford a view of the outside from the inside of the room. As the sun lowers, as indicated by the lines $S_2$ in FIG. 2, some of the rays pass beneath the show areas 6 and strike the normal shade area 7 and thus direct rays could enter the room. However, since the rear panel 2 is of radio-chromic material, it is seen from FIG. 2 that the lower angled rays $S_2$ which pass between the show areas 6 and strike the shade areas 5 and 7, and pass therethrough, then strike portions of the rear panel 2. Since it is radio-chromic it darkens to the extent necessary to preclude these direct rays from passing, but only as much as is dictated by the height and brightness of the sun, thus leaving the view of the outside from within the room as nearly clear as possible.

Figure 3:
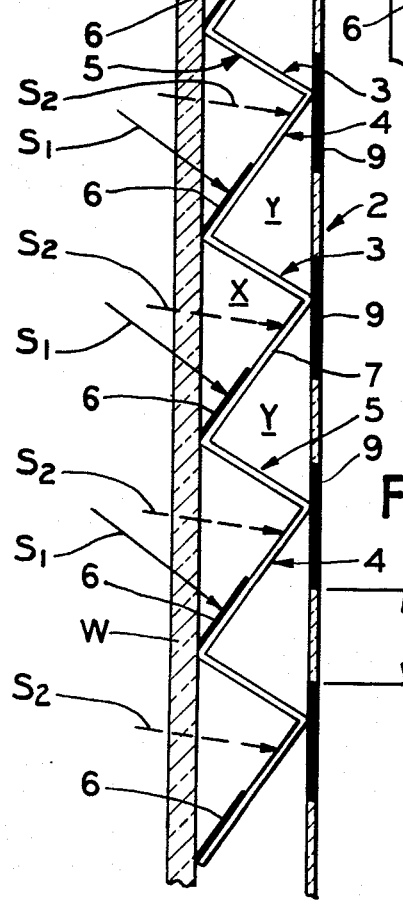
FIG. 3 is a view similar to FIG. 2, but showing the pleats of the front panel in a more widely opened condition, and illustrating other operating relations of the show and shade areas with the sun.

In some instances it may be desirable to open the pleats to a lesser or greater degree than in FIG. 2. As illustrated in FIG. 3, the pleats are opened to a greater degree, thus disposing the base sides 5 of the pleats in a position to afford a better view of the outside while still preventing the direct rays of the sun from entering. In this condition, many of the direct rays from the lower sun can strike the shade areas 7 and pass therethrough, causing darkened areas 9 on the radio-chromic rear panel 2. However, due to the obliquity of the sides 5 this allows greater show areas, as indicated at A, in FIG. 3, through which the outside can be viewed.

The shade can be made with the two panels held in face to face juxtaposition, or near to this juxtaposed relation, with the rear panel 2 engaging the rear crests of the pleats. If desired, the rear panel 2 may be adhered to all or part of these rear crests, or merely secured in the face to face juxtaposition without adherence to the front panel 1 so that the pleats of the front panel can be opened or closed to different degrees, as desired.

For example, the upper edge of the front panel may be secured to the window sill or pane W so that the front crests of the pleats are against the pane. Since without stress, the pleats return to closed or flat condition, the front panel can then be pulled downwardly to impart any selected degree of openness to the pleats, and then fastened in the selected position by suitable hooks. However, in most instances, depending upon the latitude of the place, the degree of openness of the sheets for different exposures can readily be determined so that the front panel can be connected at the top, bottom and the sides to the windowpane permanently with the forward crests of its pleats against the windowpane and with the rear panel 2 secured to the rear crests of the panel 1. This has a distinct advantage in that the triangular spaces, such as indicated at X, between the pane W and the front face of the pleated panel 1 provide dead air insulating spaces, and the spaces Y between rear face of the front panel 1 and the front face of the rear panel 2 provide additional dead air insulating spaces, thus doubling the insulating effected obtained by the shade, as compared to the shades of the above patents.

It is apparent, therefore, that with the present structure one has a greater range of selection of the degree of indirect light to be admitted consistent with the optimum clarity of view of the outside through the shade. The shade can be adjusted to exclude all direct light for all elevations of the sun while admitting diffused light. The shade has the advantages of economies in construction, compared to the patented radio-chromic shade, as photo-chromic sheet material is generally produced in the form of flat sheets of plastic or glass as a standard product.

Again, due to doubling the number of dead air spaces, especially when the panels are sealed at the ends, either by the window frame or by separate sealing strips, so little moisture is entrapped that it cannot collect and drain down the windowpane.

If desired, the shade can be made ready for with the front panel in the desired open pleat condition and with rear photo-chromic panel attached and sealed at the ends of the pleats, either by a frame or by a suitable sealing strip of plastic material as desired.

Having thus described my invention, I claim —

1. A radiant energy shade comprising
a front panel;
a rear panel;
said panels being generally coextensive in length and width and facing toward each other;
said front panel having a plurality of predetermined show areas arranged in a regular, repetitive, contoured pattern and a plurality of transparent shade areas between show areas;
said show and shade areas being related to each other so that, when the front of the panel is exposed toward a source of radiation in certain predetermined angular relation to the source, the show areas are positioned to receive direct rays emitted from said source and to lie in ray intercepting relation between said source and the shade areas; and so that in other angular relations to the source, the show areas are in unintercepting relation to the shade areas so that the shade areas are exposed to, and receive, direct rays from the source;
said show areas being opaque and reflective so as to intercept, and reflect forwardly, direct rays impinging thereon from the source in said predetermined angular relations, and to prevent direct rays from striking its shade areas; and
said rear panel being of radio-chromic material, so as to darken where struck by said direct rays, and being spaced rearwardly from said shade areas throughout most of the extent of the shade areas and so as to be impinged upon, and caused to darken, by direct rays from said source through the shade areas in said other angular relations.

2. A radiant energy shade according to claim 1 wherein the rear panel is secured directly to the front panel at various locations on the rear panel so that the panels are mutually reinforcing structurally.

3. A radiant energy shade according to claim 1 wherein the front panel is in the form of a plurality of parallel elongated elements secured in a row transversely of their lengths and having forwardly exposed faces at an oblique angle to the rear panel; and each of said elements has a show area coextensive in length therewith and extending from the forward one of its edges partway toward the rearward one of its edges, and has a transparent shade area extending from the rearward boundary of its show areas to the rearward one of its edges.

4. A radiant energy shade according to claim 3 wherein said rear panel is juxtaposed against said rear edges of the elements.

5. A radiant energy shade according to claim 4 wherein said rear panel is adhered to said elements at their rear edges.

6. A radiant energy shade according to claim 3 wherein said parallel elements are pleats in a single sheet of transparent sheet plastic material which is of pleated formation with one side of each pleat oblique to the rear panel and parallel to the corresponding side of each of the other pleats; and the other side of each pleat is a base side angularly disposed to said oblique side, and is parallel to the corresponding base side of each of the other pleats, and extends from the forward edge of said oblique side to the rear edge of the oblique side of the next adjacent pleat.

7. A radiant energy shade according to claim 1 wherein the rear panel is planar, and the front panel is a pleated sheet of transparent material in which each pleat has an oblique side and a base side;

the panels are held in a position wherein the pleats of the pleated sheet are in an open condition;

the oblique sides of the pleats have show areas and are oblique to the plane of the rear panel and the base sides of corresponding parallel oblique sides of the pleats are at a larger angle to the plane of the rear panel.

8. A radiant energy shade according to claim 7 wherein the rear panel is attached to the front sheet at the rear crests of the pleats.

9. A radiant energy shade according to claim 1 wherein said rear panel is a sheet of radio-chromic glass.

* * * * *

UNITED STATES PATENT AND TRADEMARK OFFICE
CERTIFICATE OF CORRECTION

PATENT NO. : 4,130,351
DATED : December 19, 1978
INVENTOR(S) : Sergius N. Ferris Luboshez It is certified that error appears in the above-identified patent and that said Letters Patent are hereby corrected as shown below:

Col. 4, line 5, "effected" should read --effect--.

Col. line 24, after "for" read --installation--.

Signed and Sealed this

Fifth Day of June 1979

[SEAL]

Attest:

RUTH C. MASON
*Attesting Officer*

DONALD W. BANNER
*Commissioner of Patents and Trademarks*